US012650306B2

(12) United States Patent
Ducloux et al.

(10) Patent No.: US 12,650,306 B2
(45) Date of Patent: Jun. 9, 2026

(54) GENERATOR FOR GENERATING AN ANTI-KERR-EFFECT MODULATED LIGHT SIGNAL, INTERFEROMETRY MEASURING DEVICE COMPRISING SUCH A GENERATOR, AND METHOD FOR MODULATING A LIGHT SIGNAL

(71) Applicants: EXAIL, Saint-Germain-en-Laye (FR); CENTRE NATIONAL D'ETUDES SPATIALES, Paris (FR)

(72) Inventors: Eric Ducloux, Saint-Germain-en-Laye (FR); Christophe Ollivier, Saint-Germain-en-Laye (FR)

(73) Assignees: EXAIL, Saint-Germain-en-Laye (FR); CENTRE NATIONAL D'ETUDES SPATIALES, Paris (FR)

( * ) Notice: Subject to any disclaimer, the term of this patent is extended or adjusted under 35 U.S.C. 154(b) by 260 days.

(21) Appl. No.: 18/548,842

(22) PCT Filed: Mar. 3, 2022

(86) PCT No.: PCT/EP2022/055460
§ 371 (c)(1),
(2) Date: Sep. 1, 2023

(87) PCT Pub. No.: WO2022/184855
PCT Pub. Date: Sep. 9, 2022

(65) Prior Publication Data
US 2024/0159537 A1    May 16, 2024

(30) Foreign Application Priority Data
Mar. 4, 2021    (FR) ...................................... 2102118

(51) Int. Cl.
G01C 19/72    (2006.01)
G02F 1/01    (2006.01)
G02F 1/21    (2006.01)

(52) U.S. Cl.
CPC ......... *G01C 19/721* (2013.01); *G02F 1/0123* (2013.01); *G02F 1/211* (2021.01); *G02F 2203/50* (2013.01)

(58) Field of Classification Search
CPC .... G01C 19/72; G01C 19/721; G01C 19/726; G02F 1/0123; G02F 1/211; G02F 2203/50
See application file for complete search history.

(56) References Cited

U.S. PATENT DOCUMENTS 4,773,759 A    9/1988  Bergh et al.
5,537,671 A *  7/1996  Toyama ................. G01C 19/72
                                        385/27

(Continued)

FOREIGN PATENT DOCUMENTS

FR        2660996 A1    10/1991
WO        8304305 A1    12/1983

OTHER PUBLICATIONS

Bergh, R.A. et al. "Compensation of the optical Kerr effect in fiber-optic gyroscopes". Optics Letters, vol. 7, No. 6, Jun. 1982, pp. 282-284. (Year: 1982).*

(Continued)

*Primary Examiner* — Michael A Lyons
(74) *Attorney, Agent, or Firm* — NIXON & VANDERHYE

(57)        ABSTRACT

Disclosed is a generator for generating an anti-Kerr modulated light signal, including a primary light source having four longitudinal modes or fewer and configured to generate a light signal and a modulator configured to modulate the power of the light signal by way of a square-wave or (Continued)

rectangular-wave control signal the duty cycle of which is less than or equal to 50%, and which are adapted such that the modulated light signal is periodic and has: —at a first point of the signal, a first power value equal to the product of its average power and a gain between 1.6 and 2.4; —at a second point of the signal, a second, non-zero power value, that is different from the first power value. Also disclosed is a modulation method and to a measuring device.

22 Claims, 7 Drawing Sheets

(56) References Cited

U.S. PATENT DOCUMENTS

| | | | | |
|---|---|---|---|---|
| 5,627,644 A | * | 5/1997 | Sanders | G01C 19/721 356/464 |
| 6,046,810 A | * | 4/2000 | Sanders | G01C 19/72 356/459 |
| 2015/0022818 A1 | * | 1/2015 | Lloyd | G01C 19/721 356/460 |
| 2023/0160697 A1 | * | 5/2023 | Ducloux | G01C 19/727 356/450 |

OTHER PUBLICATIONS

International Search Report w/English translation for PCT/EP2022/055460 mailed May 11, 2022, 7 pages.

Written Opinion of the ISA for PCT/EP2022/055460 mailed May 11, 2022, 8 pages.

Joachin Honthaas et al., "Interferometric Filtering of the excess relative intensity noise of the broadband source of a fiber optic gyroscope", Proceedings of SPIE, IEEE, vol. 9157, May 22, 2014, pp. 91572D-1 to 91572D-4.

H. C. Lefevre, "The fiber-optic gyroscope", Artech House, Second Edition, 2014, Chapter 7.3—Nonlinear Kerr Effect, pp. 112-117.

* cited by examiner

Figure 1: Prior art

GENERATOR FOR GENERATING AN ANTI-KERR-EFFECT MODULATED LIGHT SIGNAL, INTERFEROMETRY MEASURING DEVICE COMPRISING SUCH A GENERATOR, AND METHOD FOR MODULATING A LIGHT SIGNAL

CROSS-REFERENCE TO RELATED APPLICATIONS

This application is the US national stage of PCT/EP2022/055460, filed Mar. 3, 2022, and designating the United States, which claims the priority of FR FR2102118, filed Mar. 4, 2021. The entire contents of each foregoing application are incorporated herein by reference.

TECHNICAL FIELD

The present invention relates to the field of optics, in particular the propagation of light beams from a light source, for example a laser.

The invention especially relates to a generator for generating an anti-Kerr-effect modulated light signal, an interferometric measuring device comprising such a generator, and method for modulating a light signal.

The invention finds a particularly advantageous application in the field of physical parameter measurements made using in particular a Sagnac interferometer. Preferably, the invention applies to the making of a fibre optic gyroscope.

Technological Background

FIG. 1 illustrates a fibre-optic gyroscope 1a that conventionally comprises:

a light signal generator 2a, a Sagnac interferometer 3a, in which propagate an first light signal and a second light signal, which are mutually counter-propagating, said Sagnac interferometer 3a comprising an input/output port 4a receiving, in a forward direction 5a, an input light signal, an optical splitter 6a connected, on the one hand, to said input port 4a and, on the other hand, to a first arm 7a and to a second arm 8a of said Sagnac interferometer 3a, a fibre-optic loop 9a, a first end of which is coupled to the first arm 7a and a second end of which is coupled to the second arm 8a, configured in such a way that a rotation of the gyroscope 1a in the plane of FIG. 1 generates a phase shift between the counter-propagating signals propagating in the loop 9a, the input/output port 4a transmitting, in a return direction 10a, opposite to the forward direction 5a, an output light signal having an output light power that is function of the phase shift between the two counter-propagating signals, a photodetector 11a, configured to receive the output signal and to produce an electrical signal representative of the output light power, and an optical coupler 12a that couples, in the forward direction 5a, the light signal generator 2a to said input/output port 4a and, in the return direction 10a, the input/output port to the photodetector 11a.

Such an interferometric measuring device 1a can for example be used in an Interferometric Fibre-Optic Gyroscope (or "I-FOG"), the physical parameter to be measured being in this case a rotation.

In most current fibre optic gyroscopes, the light signal generator includes a light source that emits a light signal the spectral band of which extends over a width conventionally between a few nanometres and a few tens of nanometres. For example, the source is conventionally a so-called ASE ("Amplified Spontaneous Emission") source or a so-called SLED ("Superluminescent Light Emitting Diode") source. The use of such sources has, on the one hand, the advantage to limit the non-linearity effects in the fibre (for example, the Kerr effect detailed hereinafter) that induce a bias in the measurements, and has, on the other hand, the advantage to limit the parasitic optical interferences and the Rayleigh feedback, which are sources of noise that disturb measurements.

However, these sources have several drawbacks, among which high power consumption, high production cost, large surface area, high thermal rise in operation, or also unsatisfactory scale factor and the presence of noise of the RIN ("Relative Intensity Noise") type in the rotation measurement.

The single-frequency sources, also called single-mode sources, such as laser diodes, in particular the diodes of the DFB ("Distributed Feed-Back") type, make it possible to overcome broad-spectrum source drawbacks. However, although they have already been considered for making interferometers, their use has been greatly reduced in favour of broad-spectrum sources, in particular due to the importance of Kerr effect they generate.

The Kerr effect refers to an electro-optical birefringence phenomenon, that is to say a variation of the refractive index of a material under the effect of an electric field. In a fibre-optic gyroscope, this electric field is generated by the electric fields of the counter-propagating signals and each of the counter-propagating beams thus undergoes an auto-induced Kerr effect and a Kerr effect induced by the other counter-propagating signal.

Thus, in a fibre-optic gyroscope, the Kerr effect generates a phase shift $\Delta\varphi k$ between the two counter-propagating signals, that the measurement means of the gyroscope, here the photodetector 11a, are not able to distinguish from the phase shift $\Delta\varphi r$ generated by the rotation. The Kerr effect therefore distorts the result of the rotation measurement.

It is to be noted here that, in the field of interferometric measurements, it is conventional to define a reference direction of propagation in the optical loop. In such a case, it is then talked about a co-propagative signal, that it so say propagating in the reference direction, and a counter-propagating signal propagating in the opposite direction. For the sake of simplification, no reference direction has been defined here and the two signals are considered to be counter-propagating with respect to each other.

It has been observed that in a fibre-optic gyroscope, the phase shift $\Delta\varphi k$ generated by the Kerr effect is expressed by the following formula:

$$\Delta\varphi k = \varepsilon(\gamma-1)(P_{Mes}-\alpha<P>)k*L \qquad \text{[math. 1]}$$

with $\gamma$ the Sagnac channel balancing, that is to say the ratio between the average optical powers (measured over an integer number of modulation periods) of each of the two channels of the interferometer, $P_{Mes}$ the output power at the measurement point, k the optical wave number and L the optical fibre length.

The factor $\varepsilon$ is a characteristic value of the optical fibre, representative of the refractive index variation induced by the counter-propagating signals. In a silica optical fibre, this factor depends on the dielectric susceptibility of silica $$\chi_e^{(3)}$$

and is equal to about $2\times10^{-15}$ $\mu W^{-1}$. This characteristic value is detailed in particular in "The fiber-optic gyroscope", H. C. Lefèyre, *Artech House, Second Edition,* 2014, *Chapter 7.3.*

The factor $\alpha$ is a constant close to 2 or equal to 2, for example between 1.6 and 2.4, the value of which is specific to a gyroscope structure. This value is determined by calibration by making a reference measurement, for example a measurement of the speed of rotation of the earth by positioning the gyroscope in two opposite directions in order to find the Kerr value by summing the two results, and by adjusting—in the electronic circuitry of the source—the value of $\alpha$ that cancels this residue.

It is therefore obvious that the phase shift $\Delta\varphi k$ induced by the Kerr effect is zero when the ratio between the power at the measurement point $P_{Mes}$ and the average output power $<P>$ is equal to the factor $\alpha$.

This condition would in particular be satisfied for an ideal square-wave light signal, of duty cycle (ratio of the high state duration to the light signal period) equal to 50%; however, it is very difficult to obtain such a light signal. Indeed, although it is possible to control a light source, in particular a laser, with an almost-ideal square-wave electrical signal, the intrinsic characteristics of the laser diode and its power supply circuit cause the light signal to be distorted and to have a duty cycle that is not identical to that of the control signal. It is therefore difficult to respect the above-mentioned ratio between the power at the measurement point $P_{Mes}$ and the average power $<P>$.

SUMMARY OF THE INVENTION

The present invention provides a solution to the above-mentioned problems.

According to one aspect, it is proposed a generator for generating an anti-Kerr modulated light signal, including a primary light source having four longitudinal modes or fewer and configured to generate a light signal, and means for modulating the light signal configured to modulate the power of the light signal by way of a square-wave or rectangular-wave control signal the duty cycle of which is lower than or equal to 50%, and which are adapted such that the modulated light signal is periodic and has:

at a first point of the signal, a first power value equal to the product of its average power by a gain between 1.6 and 2.4, at a second point of the signal, a second, non-zero power value, that is different from the first power value.

The use of two non-zero power values makes it possible to compensate for the effect of the signal distortion to the ratio between the measured power and the average power. Thanks to the invention, the light signal generator provides a modulated signal able to be transmitted in a Sagnac interferometer, in particular a fibre-optic gyroscope, without generating Kerr effect or by generating a greatly reduced Kerr effect.

According to an embodiment, the control signal has a duty cycle strictly lower than 50%.

Voluntarily setting the duty cycle to a value of less than 50% (which may be seen as a voluntary distortion of the signal), rather than to a value equal to 50%, makes it possible to ensure the existence of a second non-zero power value enabling the above-mentioned ratio between the first power value and the average power to be respected, despite the distortions of the light signal with respect to the control signal.

According to an alternative embodiment, the primary light source can be a laser diode.

A laser diode advantageously exhibits low power consumption, low production cost, small footprint, satisfactory scaling factor due to wavelength stability and moderate thermal rise in operation. Moreover, the presence of noise of the RIN (Relative Intensity Noise) type in the rotation measurement is extremely reduced. The generator according to the invention is thus greatly improved.

According to an embodiment, the gain is equal to 2.

Therefore, the gain is a good estimation of the value of the factor $\alpha$. Preferentially, the gain is chosen to be equal to the factor $\alpha$.

According to an alternative embodiment, the modulation means include means for adjusting the second power value of the light signal.

According to an embodiment, the modulation means include means for adjusting the duty cycle of the control signal.

The means for adjusting the second power value and/or the duty cycle enable the modulation to be adjusted optimally according to the intended application.

According to an embodiment, the first power value is the maximum power value of the modulated light signal.

Preferentially, the second power value is the minimum power value of the modulated light signal.

According to an embodiment, the generator includes a feedback loop producing a feedback signal representative of the difference between the first value and the average power of the modulated light signal multiplied by the gain, the modulation means being controlled by the feedback signal.

A feedback loop advantageously eliminates the need for manual adjustment of the generator. Moreover, the modulation accuracy is improved because the feedback loop allows a dynamic adjustment of the modulation.

According to an embodiment, the feedback loop includes a photodetector configured to receive part at least of the modulated light signal and to produce a first signal representative of the light signal power, a first filter configured to produce a second signal equal to the average value of the first signal multiplied by the gain, a second filter configured to produce a third signal equal to the first value, a feedback control module configured to compare the second signal and the third signal and to produce the feedback signal representative of the difference between the second signal and the third signal.

According to an embodiment, the primary light source comprises an integrated photodetector.

The generator is thus more compact with respect to a generator including a photodetector distinct from the primary light source.

According to an embodiment, the modulation means are adapted to modulate the power supply for the primary light source.

According to an embodiment, the modulation means comprise an optical modulator located downstream from the primary light source.

According to another aspect, it is proposed a method for modulating a light signal emitted by a primary light source having four longitudinal modes or fewer, including a step of modulating the light signal by way of a square-wave or rectangular-wave control signal the duty cycle of which is lower than or equal to 50% in such a way that the modulated light signal is periodic and has:

at a first point of the signal, a first power value equal to the product of its average power by a constant between 1.6 and 2.4, at a second point of the signal, a second power value that is different from the first power value and non-zero.

According to an implementation mode, the duty cycle of the control signal is strictly lower than 50%.

According to an embodiment, the gain is equal to 2.

According to an implementation mode, the modulation step includes an adjustment of the second power value of the light signal.

According to an implementation mode, the modulation step includes an adjustment of the duty cycle value of the light signal.

According to an implementation mode, the modulation step includes a feedback control of the modulation by a feedback signal representative of the difference between the first value and the average power of the light signal multiplied by the gain.

According to an embodiment, the modulation step includes a modulation of the power supply for the primary light source.

According to an embodiment, the modulation step includes an optical modulation of the light signal emitted by the primary light source.

According to an implementation mode, the method includes a feedback control of the modulation by an external synchronisation signal.

According to another aspect, it is proposed a interferometric measurement device including a modulated light signal generator according to the invention.

According to an embodiment, the interferometric measurement device is a fibre-optic gyroscope.

The different features, alternatives and embodiments of the invention can be associated with each other according to various combinations, insofar as they are not incompatible or exclusive with respect to each other.

BRIEF DESCRIPTION OF THE DRAWINGS

Moreover, various other features of the invention emerge from the appended description made with reference to the drawings that illustrate non-limiting embodiments of the invention, and wherein.

It is to be noted that, in these figures, the structural and/or functional elements common to the different alternatives can have the same references numbers.

Various other modifications may be made to the invention within the scope of the appended claims.

DETAILED DESCRIPTION

Figure 1:
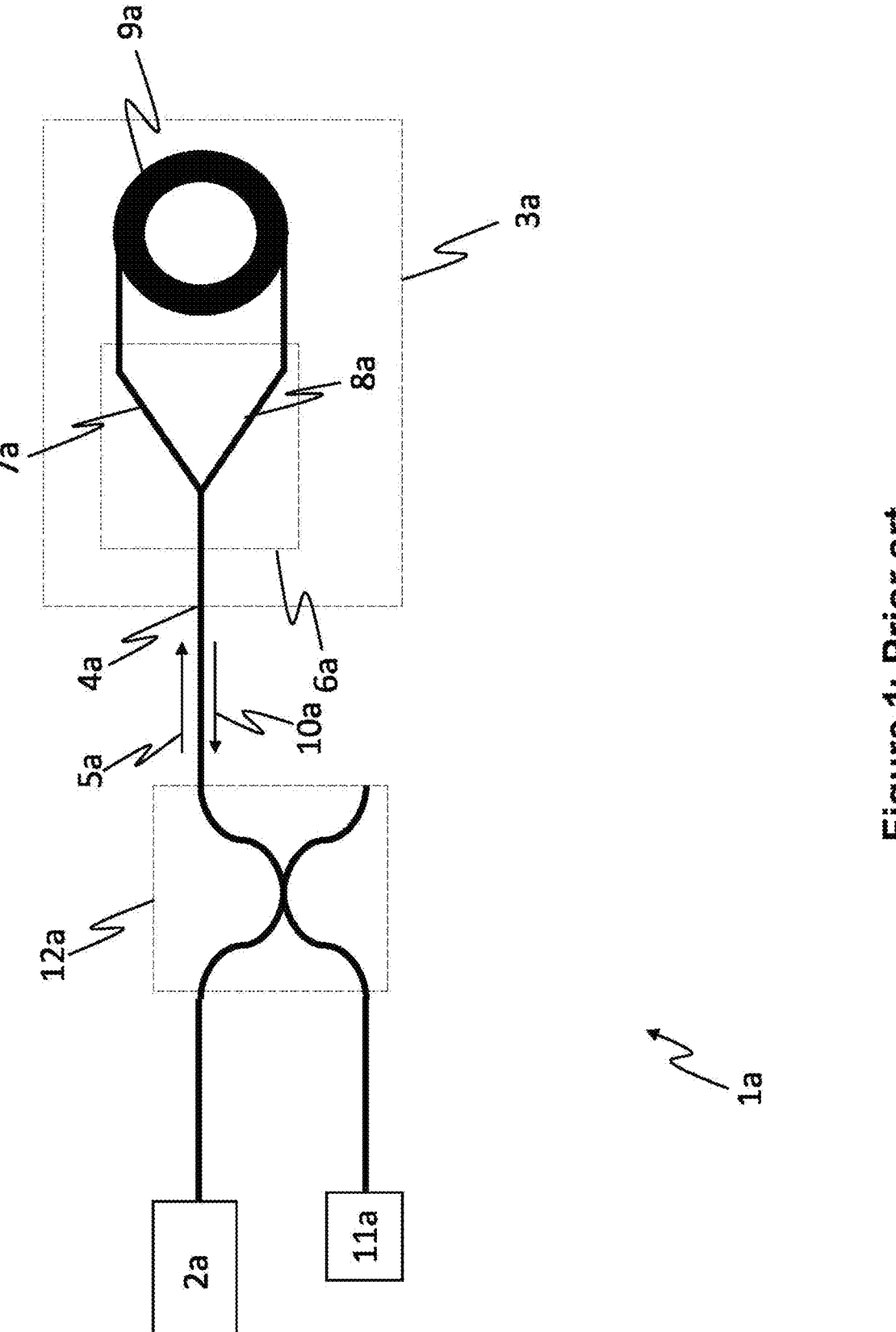
FIG. 1 described hereinabove illustrates a conventional architecture of a fibre-optic gyroscope.
Figure 2:
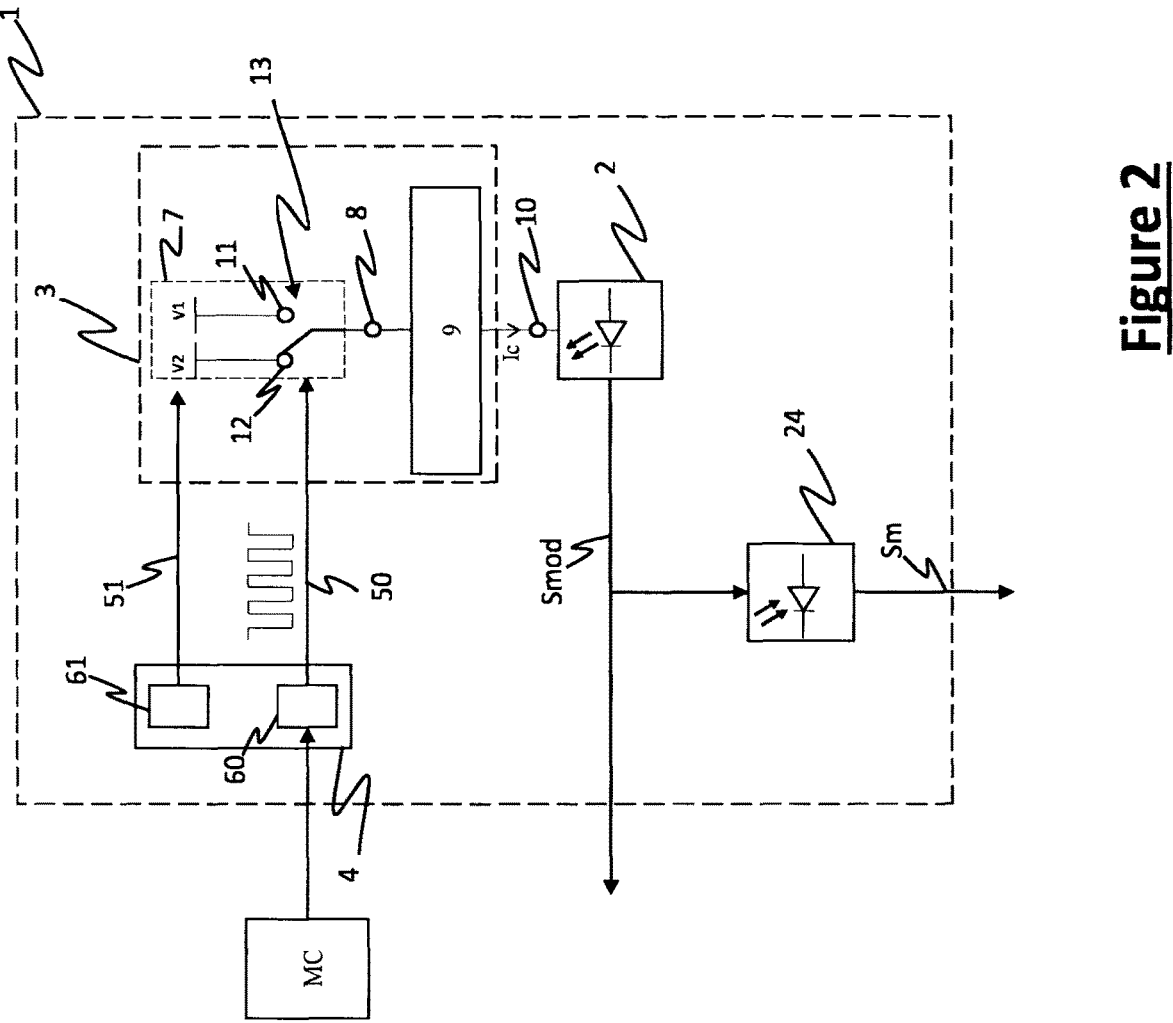
FIG. 2 is a block diagram illustrating a modulated light signal generator according to an embodiment of the invention.

The modulated light signal generator 1 illustrated in FIG. 2 includes a primary light source 2 configured to generate a light signal having a single longitudinal mode. The primary source 2 is here supplied by a current source 3 and produces a light signal Smod modulated by modulation means 4 or modulation circuit, in such a way as to have a first power value, or high value, and a second power value, or low value.

In this example, the primary light source 2 is an integrated laser diode of the DFB type, conventionally including a PN junction, a waveguide and an optical resonance cavity with a Bragg grating. A DFB-type diode is configured to produce a single-frequency light signal.

The current source 3 here includes a voltage supply module 7 producing, at an intermediate supply terminal 8, an intermediate voltage and a voltage-current conversion circuit 9 producing, at a main supply terminal 10, the supply current Ic for the primary light source 2.

The voltage supply module 7 includes a first supply terminal 11 configured to produce a first supply voltage V1, for example here 3 volts, a second supply terminal 12 configured to produce a second supply voltage V2, which can here take for example any value between 0 and 1 volt, and a two-way switch 13 coupled between the two supply terminals 11, 12 and the intermediate terminal 8.

The two-way switch 13 is configured to be either in a first configuration in which the current-voltage conversion circuit 9 is coupled to the first supply terminal 11, or in a second configuration in which the conversion circuit 9 is coupled to the second supply terminal 12. For example, the two-way switch 13 is here a semi-conductor integrated circuit. The two-way switch 13 is electrically controlled by a control signal 50, or a modulation control signal.

The modulation means 4 are here configured to adjust the modulation parameters, i.e. here the value of the second supply voltage V2 and hence the second power value, and are configured to adjust the duty cycle by controlling the two-way switch 13.

The modulation means 4 are here configured to produce the control signal 50, which here controls the two-way switch 13 and which is a square-wave signal liable to be either in a high state or in a low state. For example, here, the modulation means 4 include a communication interface 60, for example a connector or a terminal board, making it possible to receive the control signal 50 from the outside, for example from centralized control means MC of an interferometer to which the light signal generator 1 is coupled.

The control means MC of the gyroscope are configured to produce the first control signal 50 having here a fixed duty cycle lower than 50%, for example 47%.

The two-way switch 13 is configured to be in its first configuration when the control signal 50 is in the high state and in its second configuration when the control signal 50 is in the low state.

The modulation means 4 include means 61 for adjusting the value of the second supply voltage V2. For example, the adjustment means 61 comprise a mechanically adjustable potentiometer to adjust the value of the second supply voltage between 0 volt and 1 volt. In FIG. 2, the action of the adjustment means 61 on the second voltage V2 is symbolized by an arrow marked 51.

Therefore, by varying periodically the voltage produced by the intermediate supply terminal 8, the control signal 50 modulates the intensity value of the supply current Ic and thus the power value of the modulated light signal Smod emitted by the primary light source 2.

The modulated light signal Smod emitted by the primary light source 2 has thus the first power value, for example here equal to 2 mW, when the primary light source is supplied by the first voltage V1, and the second power value lower than the first power value when the primary light source 2 is supplied by the second voltage V2. The second power value is adjustable by adjustment of the second voltage V2. Because none of the two voltages V1 and V2 is zero, none of the two power values of the modulated signal is zero and the modulated light signal Smod is not extinguished.

Here, the transfer functions of the current source 3 and of the primary light source 2 are such that the modulated light signal Smod is distorted and has not a duty cycle identical to that of the control signal 50. In particular, the modulated signal Smod is distorted in such a way that it is not a square-wave signal; it is therefore difficult to determine a duty cycle thereof.

The generator 1 further includes a photodetector 24 configured to receive a part of the modulated light signal Smod and to produce a measurement signal Sm representative of the power of modulated light signal Smod. Here, the photodetector is an integrated photodiode.

Here, the photodetector 24 is integrated to the bottom of the laser diode cavity and receives all the power of the light signal emitted on this side. As an alternative, the photodetector can be located outside the laser diode 2, downstream from the laser diode 2 relative to the direction of propagation of the light signal in such a way as to receive part of the optical power of the light signal, for example 5%.

The second power value can thus be adjusted here, in particular depending on the value of the measurement signal and of operations performed on it.

Figure 3:
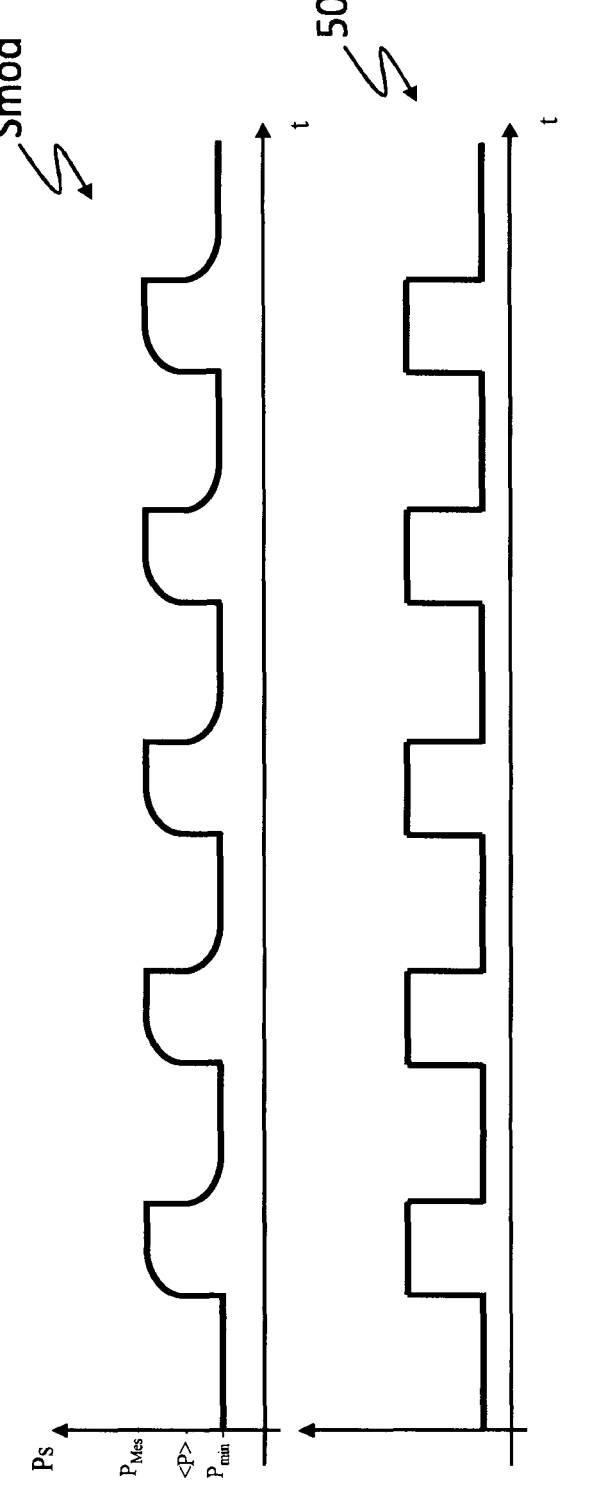
FIG. 3 is a chronogram illustrating the output power of the modulated light signal of a generator according to the invention as well as the value of the modulation control signal.

FIG. 3 is a chronogram showing the evolution of the value of the control signal 50 and of the power value of the modulated light signal Smod produced by the light signal generator 1, or output power Ps. The control signal 50 is here a square-wave signal having a duty cycle of 47%.

The modulated light signal Smod is here substantially distorted with respect to the control signal 50. This distortion is in particular due to the architecture of the light signal generator 1, to the materials used and to the conditions in which the generation of the modulated signal Smod is implemented. The modulated light signal Smod is not extinguished or, in other words, has a non-zero low (or minimal) state.

Here, taking into account the shape of the modulated signal Smod, the average power <P> of the signal Smod is equal to 1 mW. Here, the equality $P_{Mes}-\alpha<P>=0$ is respected. The light signal generator 1 thus advantageously allows the Kerr effect to be reduced.

Figure 4:
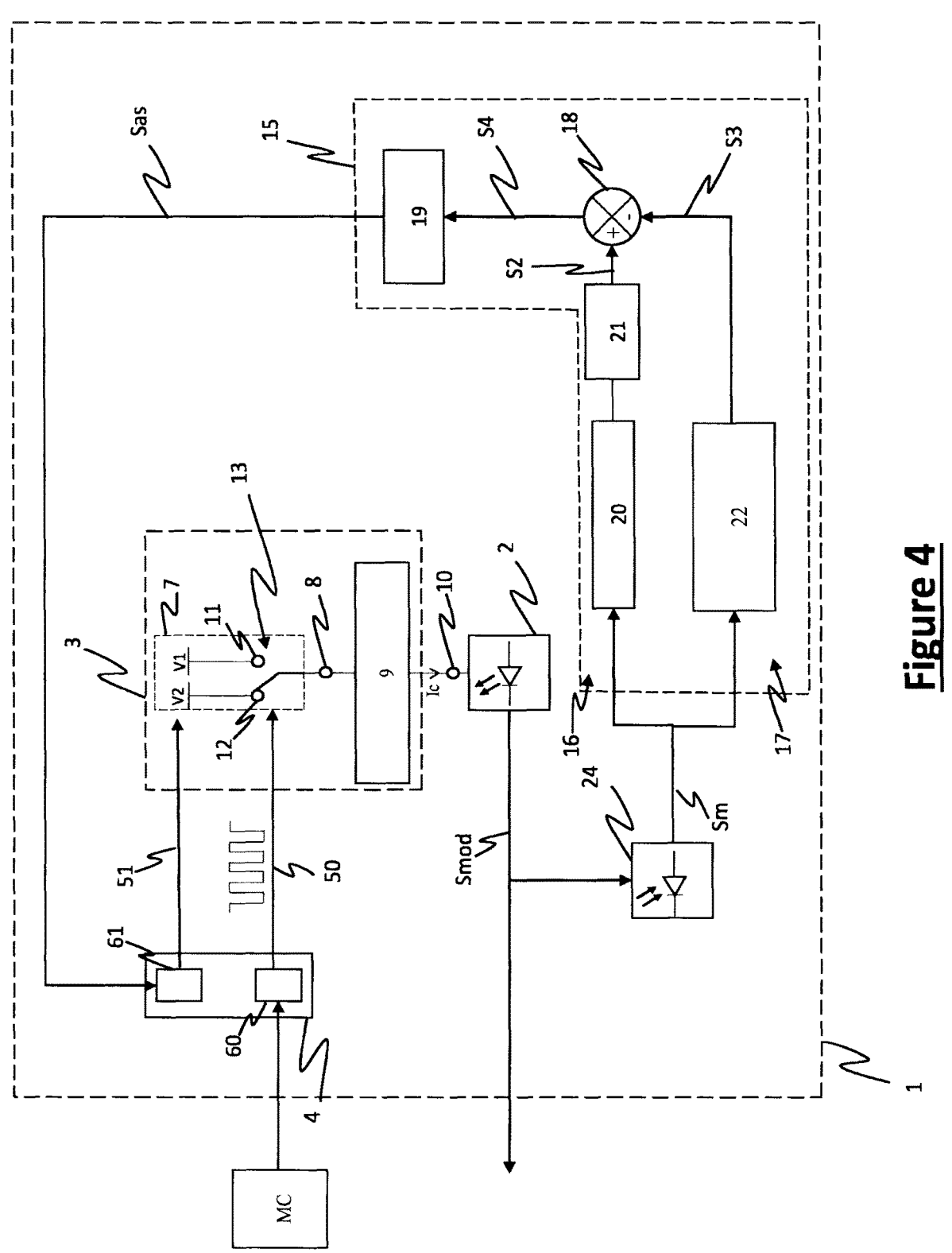
FIG. 4 illustrates an alternative embodiment of the light signal generator according to the invention, wherein the generator includes a feedback loop for controlling the minimum power of the light signal.

In the alternative embodiment illustrated in FIG. 4, the light signal generator 1 includes a feedback loop including a feedback control module 15 configured to produce a feedback signal Sas for adjusting the value of the second supply voltage V2.

The feedback control module 15 is here configured to produce a feedback signal Sas representative of the integration of the difference between the power of the modulated signal Smod having the first power value and the average value of the modulated light signal Smod multiplied by the gain, here equal to 2.

Here, the adjustment means 61 have an analog potentiometer controlled by the feedback signal Sas and are configured to feedback control the value of the second supply voltage V2 based on the cancellation of the difference between the power of the modulated signal Smod having the first power value and the average value of the modulated light signal Smod multiplied by the gain.

The feedback control module 15 includes a first branch 16 and a second branch 17, each configured to receive a first signal, here the measurement signal Sm. The feedback control module 15 further includes a subtractor 18 including a first input coupled to the first branch 16, a second input coupled to the second branch 17, and an integrator 19.

The first branch 16 is configured to perform operations on the measurement signal Sm in order to send to the first input of the subtractor 18 a second signal S2 the value of which is representative of the average power of the modulated signal Smod multiplied by the gain, here equal to 2. For example here, the first branch includes a low-pass filter 20 and an amplifier 21 with the gain, coupled in series between the photodetector 24 and the subtractor 18.

The second branch 17 is configured to perform an operation on the measurement signal Sm in order to send to the second input of the subtractor 18 a third signal S3 the value of which is representative of the maximum power value of the modulated signal Smod. For example here, the second branch 17 includes a peak detector 22 that conventionally includes a resistive-capacitive circuit and at least one diode.

The subtractor 18 is here configured to establish the difference between the values of the signals S2, S3 from the first and second branches 16, 17, and to produce a fourth signal S4 representative of this difference. For example here, the subtractor 18 includes a differential amplifier.

The fourth signal S4 is transmitted to the integrator 19 that integrates the fourth signal S4 in such a way as to generate the feedback signal Sas controlling the value of the second supply voltage V2.

Figure 5:
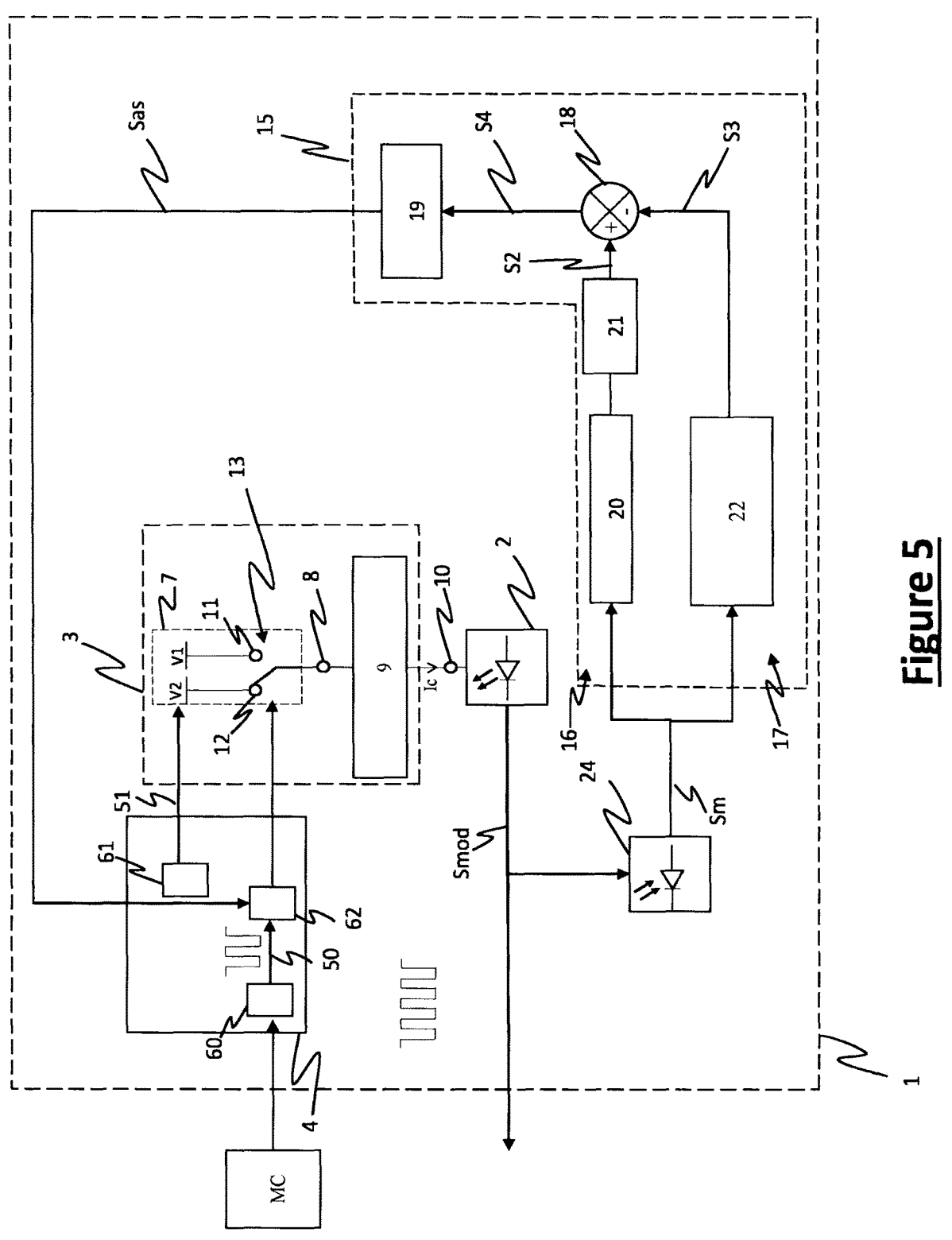
FIG. 5 illustrates an alternative embodiment of the light signal generator according to the invention, wherein the generator includes a feedback loop for controlling the duty cycle.

As an alternative, as illustrated in FIG. 5, it would be possible that the feedback control module 15 is configured to feedback control the duty cycle value of the control signal 50, the value of the second supply voltage V2 being constant or manually adjustable.

According to this embodiment, the modulation means 4 include an adjustment module 62 of the duty cycle, coupled between the communication interface 60 and the two-way switch 13 controlled by the feedback signal Sas and configured to adjust the duty cycle of the control signal 50 and to produce an adjusted control signal.

For example, the adjustment module 62 includes an RC circuit, an adder and a Schmitt flip-flop.

In another embodiment, the adjustment module 62 is not feedback controlled but makes it possible to manually adjust the duty cycle value. For example, the adjustment module includes a potentiometer.

Figure 6:
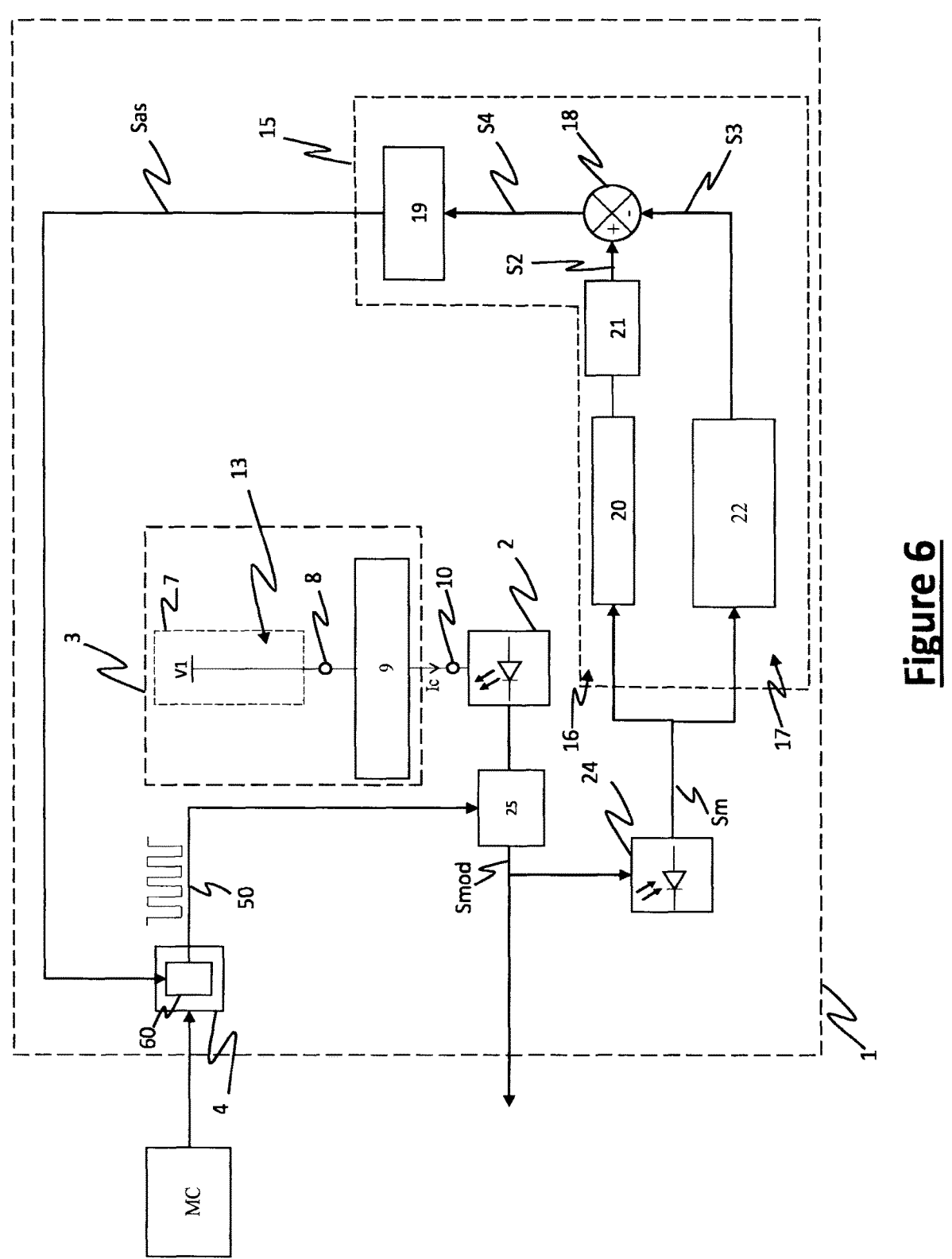
FIG. 6 illustrates an alternative embodiment of the light signal generator according to the invention, wherein the generator includes an optical modulator.

In the embodiment illustrated in FIG. 6, the light signal generator 1 does not include electronic modulation means, but optical modulation means 25 located downstream from the primary light source 2 relative to the direction of propagation of the light signal emitted by the source 2. The optical modulation means 25 here include an optical intensity modulator configured to modulate the light signal generated by the primary light source 2 in such a way as to produce the modulated light signal Smod. Here, the optical modulator 25 is a modulator of the Mach Zehnder type. It is to be noted that, in this embodiment, the photodetector 24 is not integrated into the cavity of the laser diode 2 but consisted of a separate component. For example, 5% of the power of the modulated light signal Smod is here directed towards the photodetector 24.

The current source 3 does not include here a two-way switch and the current Ic provided has a constant value. For example, the intermediate supply terminal 8 is configured to produce the first supply voltage V1.

Here, the feedback signal Sas is transmitted to the control means that are in this example designed to adjust the duty cycle and/or the second power value of the light signal.

Figure 7:
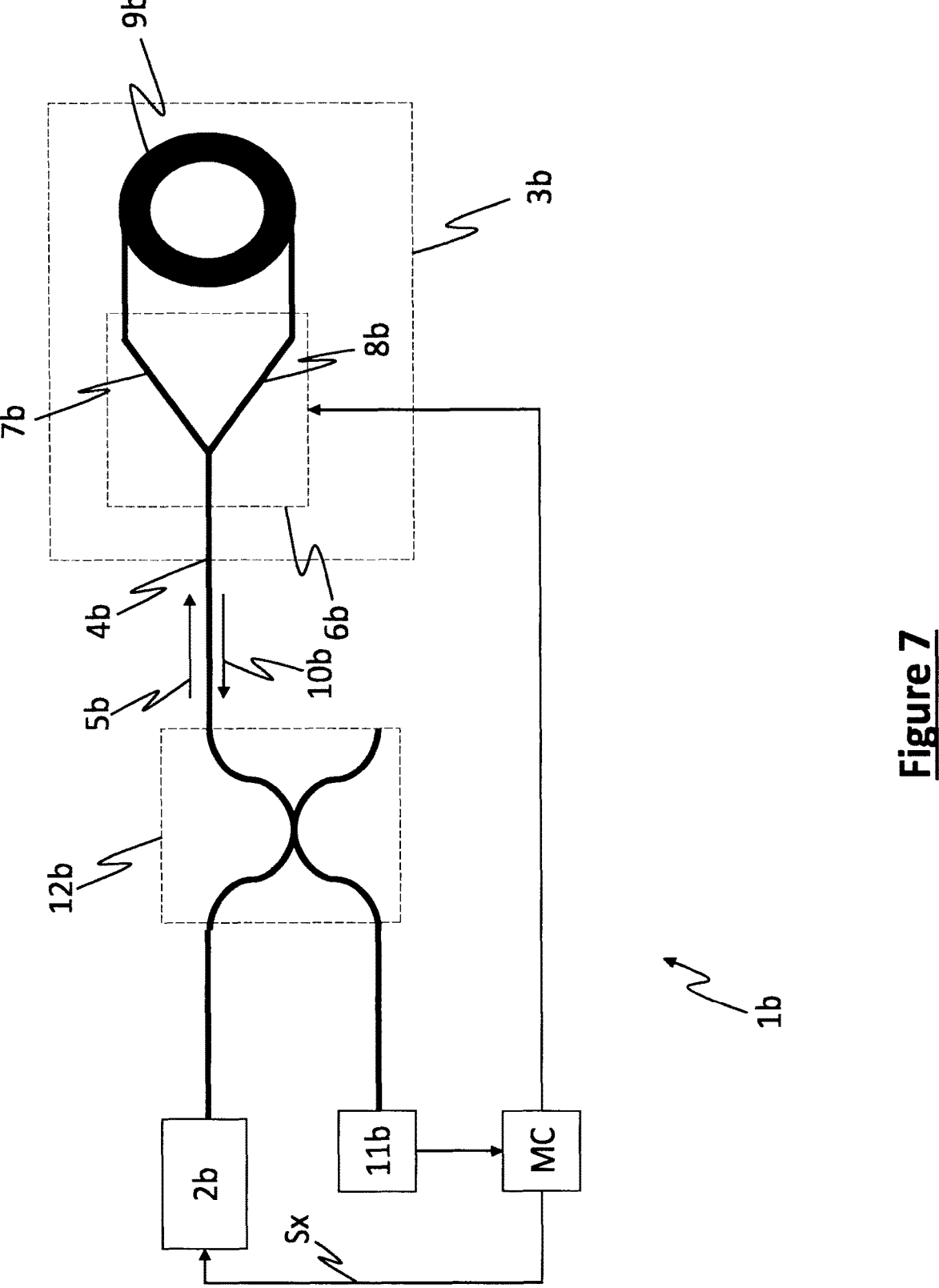
FIG. 7 illustrates a fibre-optic gyroscope including a modulated light signal generator according to the invention.

FIG. 7 illustrates an interferometric measuring device 1b, here a fibre-optic gyroscope including a Sagnac interferometer 3b, in which propagate a first light signal and a second light signal, which are mutually counter-propagating, said Sagnac interferometer 3b comprising an input/output port 4b receiving, in a forward direction 5b, an input light signal, an optical splitter 6b connected, on the one hand, to said input port 4b and, on the other hand, to a first arm 7b and to a second arm 8b of said Sagnac interferometer, a fibre-optic loop 9b, a first end of which is coupled to the first arm 7b and a second end of which is coupled to the second arm 8b, configured in such a way that a rotation of the gyroscope in the plane of FIG. 7 generates a phase shift between the counter-propagating signals propagating in the loop, the input/output port 4b transmitting, in a return direction 10b, opposite to the forward direction 5b, an output light signal having a output light power that is function of the phase shift between the two counter-propagating signals, a photodetector 11b, configured to receive said output light power and to produce an electrical signal representative of the output light power, an optical coupler 12a that couples, in the forward direction 5b, the light source to said input/output port 4b and, in said return direction, the input/output port 4b to the photodetector 11b, a light signal generator 2b according to the invention, the control means MC in particular configured to produce a control signal Sx here acting as a synchronisation signal, the characteristics of which are calculated by the control means MC as a function in particular of the time of circulation of the light in the sensor 9b. Thus, the generation of the modulated light signal is made synchronously with the gyroscope operation. The control means MC are further configured to perform, synchronously, operations of phase and power modulation of the light signals circulating in the gyroscope 1b, in particular at the optical splitter 6b.

In this device, the consequences of the Kerr effect are greatly reduced thanks to the presence of the generator according to the invention.

The invention is not limited to the embodiments described hereinabove in relation with FIGS. 1 to 7.

In particular, it has been described hereinabove a generator including a primary light source that is a laser diode of the DFB type. However, the invention is compatible with any type of light source having a number of modes smaller than four. Preferentially, the invention is compatible with a single-frequency light source or the operation of which is similar to a single-frequency operation. For example, the laser diodes of the Fabry Perot type, which emit in very few modes, leaving much less powerful secondary modes, are compatible with the invention.

Moreover, the value of 47% of the duty cycle of the control signal 50 described hereinabove is not limiting, and the control signal can have any duty cycle lower than or equal to 50%.

The maximum power of the modulated light signal Smod can take preferentially any value between 0.5 mW and 20 mW, as a function of the configuration of the primary light source and of the value of the first supply voltage V1. The minimum power depends on the value of the maximum power and of the duty cycle, and is then obtained by adjustment of the second supply voltage as described hereinabove.

The invention claimed is:

1. A generator for generating an anti-Kerr modulated light signal, the generator comprising:

a primary laser light source having four longitudinal modes or fewer and configured to generate a light signal; and a modulator configured to module the light signal, the modulator being configured to modulate a power of the light signal by a square-wave or rectangular-wave control signal, the duty cycle of which is lower than or equal to 50%, such that the modulated light signal is periodic and has:

at a first point of the modulated light signal, a first power value equal to the product of an average power by a gain between 1.6 and 2.4, and at a second point of the modulated light signal, a second, non-zero power value, that is different from the first power value.

2. The generator according to claim 1, wherein the duty cycle of the square-wave or rectangular-wave control signal is strictly lower than 50%.

3. The generator according to claim 1, wherein the primary laser light source is a laser diode.

4. The generator according to claim 1, wherein the gain is equal to 2.

5. The generator according to claim 1, wherein the modulator is configured to adjust the second, non-zero power value of the modulated light signal.

6. The generator according to claim 1, wherein the modulator is configured to adjust the duty cycle of the square-wave or rectangular-wave control signal.

7. The generator according to claim 1, wherein the first power value is the maximum power value of the modulated light signal.

8. The generator according to claim 1, further comprising a feedback controller system producing a feedback signal representative of a difference between the first power value and an average power of the modulated light signal multiplied by the gain, the modulator being controlled by the feedback signal to maintain the first power value equal to the product of an average power by the gain.

9. The generator according to claim 8, wherein the feedback controller includes a photodetector configured to receive at least part of the modulated light signal and to produce a first signal representative of the power of the modulated light signal, a first filter configured to produce a second signal equal to the average value of the first signal multiplied by the gain, a second filter configured to produce a third signal equal to the first power value, and a feedback system configured to determine a difference between the second signal and the third signal and to produce the feedback signal representative of the difference between the second signal and the third signal.

10. The generator according to claim 1, wherein the primary laser light source further includes an integrated photodiode.

11. The generator according to claim 1, wherein the modulator is configured to modulate a power supply for the primary laser light source.

12. The generator according to claim 1, wherein the modulator is an optical modulator located downstream from the primary laser light source.

13. An interferometric measurement device comprising: the generator according to claim 1.

14. The interferometric measurement device according to claim 13, wherein the interferometric measurement device is a fiber-optic gyroscope.

15. A method for modulating a light signal emitted by primary light source having four longitudinal modes or fewer, the method comprising:

modulating the light signal by a square-wave or rectangular-wave control signal, the duty cycle of which is lower than or equal to 50%, such that the modulated light signal is periodic and has:

at a first point of the modulated light signal, a first power value equal to the product of an average power by a constant between 1.6 and 2.4, and at a second point of the modulated light signal, a second power value that is different from the first power value and non-zero.

16. The method according to claim 15, wherein the duty cycle of the square-wave or rectangular-wave control signal is strictly lower than 50%.

17. The method according to claim 15, wherein the gain is equal to 2.

18. The method according to claim 15, wherein the modulating includes adjusting the second power value of the modulated light signal.

19. The method according to claim 15, wherein the modulating includes adjusting the duty cycle value of the modulated light signal.

20. The method according to claim 15, wherein the modulating includes feedback controlling the modulating by a feedback signal representative of the difference between the first power value and the average power of the light signal multiplied by the gain, the feedback controlling maintaining said first power value equal to the product of said average power by said gain.

21. The method according to claim 15, wherein the modulating includes modulating a power supply for the primary laser light source.

22. The method according to claim 15, wherein the modulating includes optically modulating the light signal emitted by the primary laser light source.

* * * * *